United States Patent [19]
Azzarello et al.

[11] 3,888,316
[45] June 10, 1975

[54] TRACTOR HITCH SWAY LIMITING DEVICE

[75] Inventors: Joseph A. Azzarello, Palos Heights; Fosco L. Di Vita, Chicago, both of Ill.

[73] Assignee: International Harvester Company, Chicago, Ill.

[22] Filed: Feb. 4, 1974

[21] Appl. No.: 439,514

[52] U.S. Cl. .............................. 172/450; 280/474
[51] Int. Cl. .......................................... A01b 59/043
[58] Field of Search ................... 172/450, 457, 501; 280/497, 474

[56] References Cited
UNITED STATES PATENTS

| | | | |
|---|---|---|---|
| 2,935,147 | 5/1960 | Edman et al. | 172/450 |
| 2,987,126 | 6/1961 | Horney | 172/450 |
| 3,047,076 | 7/1962 | Wier et al. | 172/450 |
| 3,709,304 | 1/1973 | Haupt | 172/450 |
| 3,721,302 | 3/1973 | Buchmuller et al. | 172/450 |

Primary Examiner—Stephen C. Pellegrino
Attorney, Agent, or Firm—Ronald C. Kamp; Floyd B. Harman

[57] ABSTRACT

A cam means pivotally fixed to the tractor frame cooperates with cam-containing bumpers carried on the lower links to control horizontal movement of the links. The cam means consists of a member having a series of spaced-apart parallel flats and a cammed surface.

5 Claims, 5 Drawing Figures

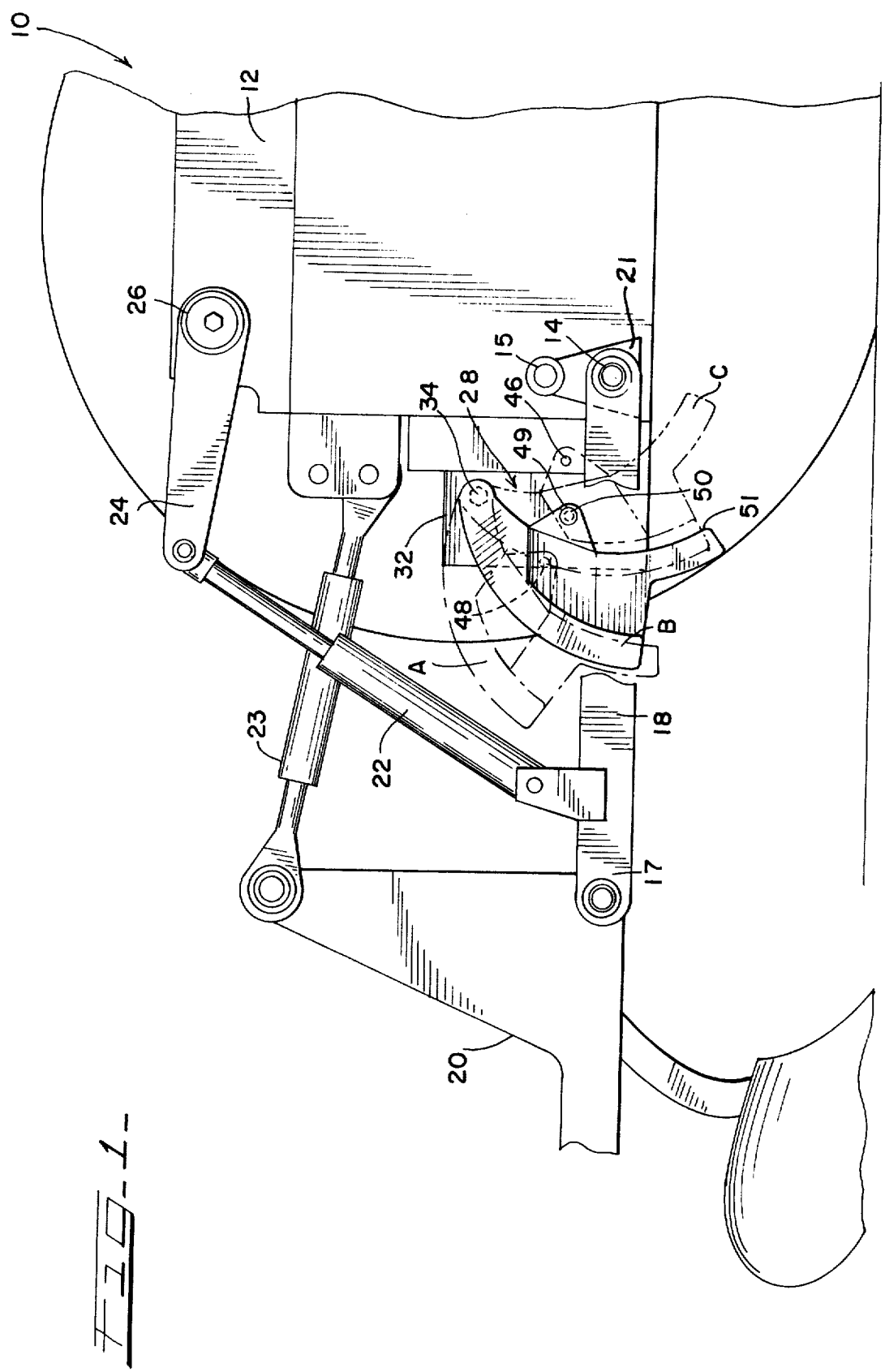

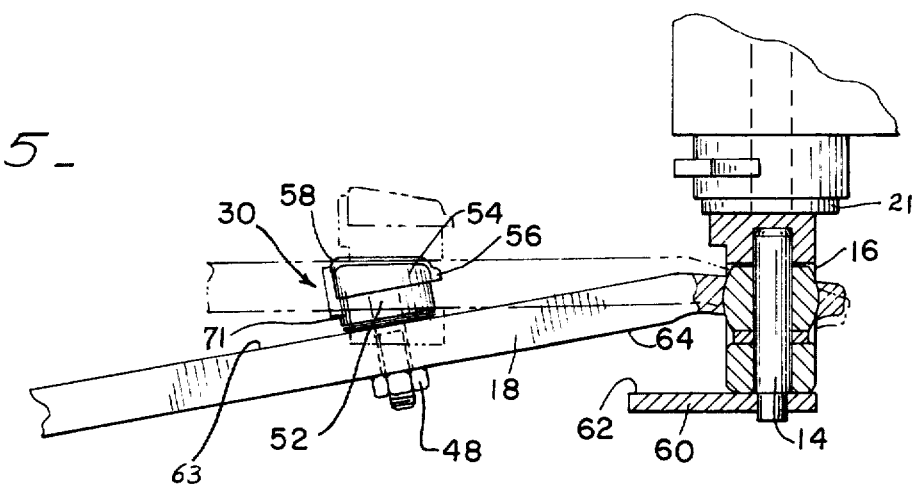
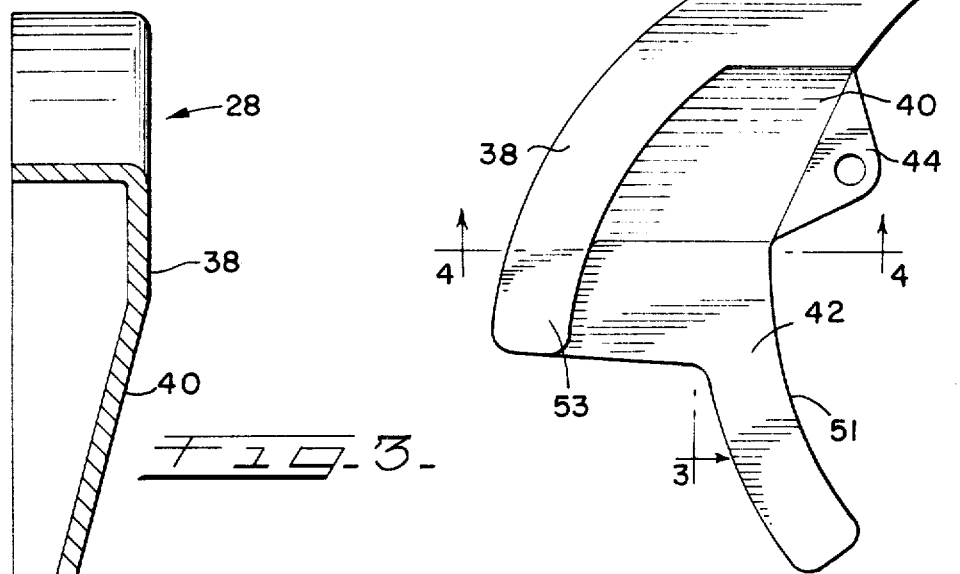
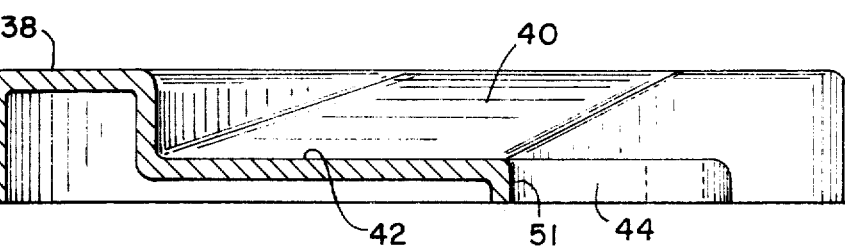
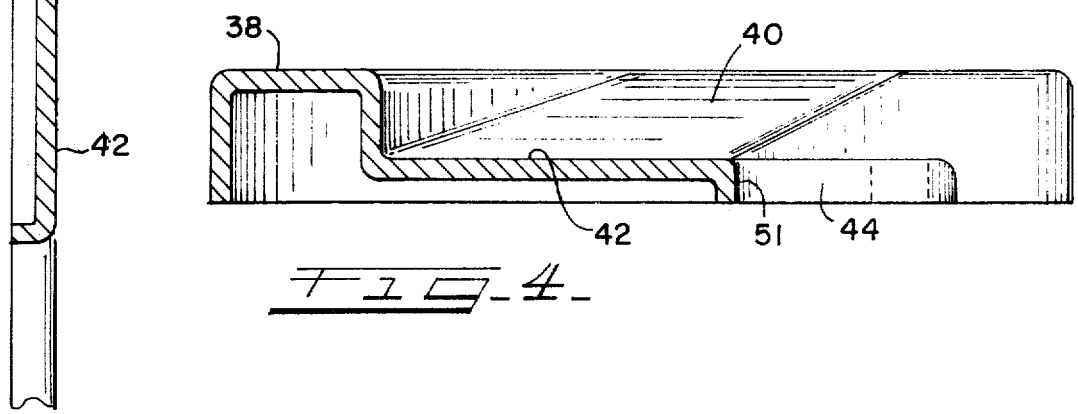

3,888,316

TRACTOR HITCH SWAY LIMITING DEVICE

This invention relates to hitch implement hitch stabalizing means but, more particularly, it is concerned with means for limiting side sway or lateral movement in a hitch of the type employed for coupling of hitch mounted implements to a tractor.

In certain types of three-point hitch tractor mounted ground working implements, such as moldboard or disk plows, it is desirable that the implement be allowed to sway or move from side to side independently of the movement of the tractor. This is particularly desirable to allow the tractor to be turned at the end of a row, or to follow a prescribed path such as in contour plowing while the attached implement continues to work the soil. Side sway or lateral movement, however, must be controlled and limited so as not to allow interference with the rear driving wheels of the vehical and, of course, it is desirable that side sway be reduced to practically nil when the implement is raised into a transport position so as to provide an arrangement that is stable and safe for transporting purposes.

In certain other types of implements, such as power take-off driven equipment and tool bars, it is desirable that the implement be restricted from any side sway throughout its working range as well as in the transport position. Since this type of implement is not usually a ground penetrating tool, vehicle maneuverability is not affected by the implement being restricted from side sway.

It is an object of the present invention, therefore, to provide a tractor having swingable draft links and power lift apparatus with sway limiting devices for controlling the side sway or lateral swing movement of the draft links. Another object of this invention is to provide a hitch sway limiting device for a tractor which has a sway, non-sway, and hitching position. Yet another object of this invention is to provide a hitch sway limiting device whose mode of operation changes depending on the orientation of the hitch links. A further object is to provide a hitch sway limiting device which regardless of its orientation locks the draft link members after they have been raised to a certain point. Yet another object of this invention is to provide a hitch sway limiting device which may be pivoted through a series of positions.

The foregoing and other objects and features of the invention will become apparent as the disclosure is more fully made in the following detailed description of a preferred embodiment of the invention as illustrated in the accompanying drawings in which:

FIG. 1 is a side view of the rear portion of a tractor, generally fragmentary in nature, showing an implement attaching hitch mechanism having incorporated therein the invention;

FIG. 2 is a fragmentary side elevational view of the pivoting cam means whereby the different modes of sway are achieved;

FIGS. 3 and 4 are sectional section views taken generally along the respective lines of FIG. 2; and FIG. 5 is a fragmentary view of one of the sway limiting structure associated with one of the draft links.

Referring now to the drawings and in particular to FIG. 1, wherein is shown the rear section of a tractor type vehicle. Since the invention therein disclosed is adaptable for use with a variety of conventional type tractors, the particular vehicle which it is illustrated as being associated with is depicted only fragmentarily and is seen as represented in its entirety by the reference number 10. As shown, this includes a main frame or chassis structure 12, which should be understood conventionally supports the power and drive components of the vehicle. Suitably mounted on opposite sides of the main frame structure 12 are lower draft links 18. Since the lower draft links 18 are mirror images of each other, any description hereafter of one link, and components associated therewith, will also be pertinent to the other link. The draft links 18 are secured at their forward ends to the vehicle by means of apertured captive ball connectors 16. Swivelly secured at these forward ends, draft link means 18 each in turn extend rearwardly therefrom and diverge outwardly away from one another. The rearward ends 17 of the lower draft links may also be provided with similar ball type connections to accommodate attachment of an implement such as a plow 20. The mast of plow 20, as shown, is pivotally connected by the upper link 23 to the vehicle's frame. Lift links 22 connect the respective draft link 18 to the associated lift arm 24. The lift arm 24 are constrained for rotation with the rock shaft 26 which may be actuated by suitable power lift means (not shown) for raising and lowering the hitch mechanism; all of which is well known and conventionally understood in the art.

As thus arranged, it will be appreciated that the draft links 18 are capable of swinging from side to side about the ball connectors 16 and additionally are pivotable about the axis of the pin 14 in a vertical plane upon actuation of the power lift means.

Horizontal or side to side movement of the draft links 18 is controlled by pivoting cam means 28. It is thus possible to control the draft links 18 whereby its horizontal movement is completely free in a hitching position, or a sway position wherein it is possible to achieve limited sway and a rigid or no-sway position. These first, second, and third conditions can be achieved by reorientating pivoting cam means 28, as shown in FIG. 1 wherein phamtom position A represents the hitching position, position B represents the sway position and phantom position C represents the rigid or no-sway positions. These particular conditions are achieved in conjunction with conversion block means as shown in FIG. 5.

The pivoting cam means 28 is pivotally secured to bracket 32 which is secured to the vehicle's frame 12. The pivotal juncture can be achieved by any suitable means. In the preferred embodiment a shaft or pin 34 is inserted through an aperture 36 in pivoting cam means 28 and a corresponding aperture (not shown) in bracket means 32.

Referring now to FIG. 2 wherein is shown the pivoting cam means 28, which includes a locking surface 38, a ramp surface 40, and a sway surface 42. The major plane of the locking surface and the sway surface are generally parallel and spaced apart, with the ramp surface forming a tapered incline from the upper lock surface 38 downwardly to the lower sway surface 42. The pivoting cam is pivotal about shaft 34, and is retained in one of the three positions A, B, or C by a pin 49. The pin 49 is inserted through the aperture 45 provided in the ear 44 formed on the cam means 28 and is selectively positioned in one of the apertures 46 or 50 formed in the bracket 32 or in the notch 48 formed in the rearward edge of the bracket 32. The cam means 28 is retained in the A position when the pin 49 is inserted in the notch 48, in the B position when the pin 49 is inserted in the aperture 50 and in the C position when the pin 49 is inserted in the aperture 46.

Each of the draft links 18 has mounted on the inner face thereof a conversion block 30 which may be fastened thereto by suitable securing means, such as for instance, bolt and nut means 48. An aperture is provided in draft link 18 to secure against horizontal or vertical movement. If necessary additional means can be provided to secure the block means against possible rotational movement during securement. Shim means 71 is provided on the inside surface means 63 of the draft link means whereby the relative position of the cam following means 54 can be determined in regard to the draft link. A conversion block 52 is employed, as shown in FIG. 5, the convert the assembly from one catagory spread to another.

The cam follower 54 has an outer surface which is substantially spherical. This is particularly advantageous because the parallel relationship of the movement of the crank arms 21 and the major planes of the cam surface means 28 motion of the crank arms forwardly or rearwardly does not alter the relationship of contact between the spherical cam follower 54 and the surfaces cam means 28. That is, when lower links 18 are put under a draft load, the draft sensor 15 will be deflected. In the preferred embodiment, draft sensor 15 is a conventional torsion bar assembly and the aforementioned deflection will be torsional deflection. The result of this is that the contact point of bumper means 30 moves rearwardly or to the left across cam 28 and there is no lateral component of movement as there would be if bending were a large component of the deflection. Hence, any motion of the crank arms does not alter the gap between the cam and the follower.

It should be noted that an arc having as its radius the distance between generally the center of shaft means 14 and bolt means 48 when pivoted around shaft means 48 passes through shaft means 34. As a consideration of FIG. 2 it will render apparent pivoting cam means 28 includes two generally curved surfaces area means which converge in the area of aperture means 36. These curved surface means include locking surface means 38 which comprises a first curve means and sway surface means 42 which comprises second curved surface means. These members are arced portions of a circle whose center is shaft means 14. When the pivoting cam means 28 is in position B an arc drawn around surface means 51 will pass generally in the area of the center of shaft means 34 with its center being shaft means 14. Further when locking cam means 28 is pivoted into phantom position C a second arc is defined by locking surface means 38 and more particularly the center portion thereof 53. This center section defines an arc the center of which is shaft means 14 which passes generally through the center of shaft means 34. All of these different arc members are combined herein the preferred embodiment as shown in FIG. 2, however, Applicant should not be limited to this single embodiment but rather stresses it is only a preferred embodiment.

An abutment means 60 is mounted on draft link means 14 by any suitable means. This abutment or guard member is dimensioned and arranged so as to prevent the associated draft link 18 from swinging into contact with the wheel of the vehicle at times when the maximum sway conditions exist in the vehicle's hitch and the draft links are thus free to swing from side to side. The inner surface 62 abuts outer edge 64 of the draft link 18 whereby prohibiting any further horizontal movement thereof.

When it is desirable to employ the tractor and associated hitch with a trail behind implement where very limited side sway or lateral movement is desired, pivoting cam means 28, as shown in FIG. 1, is rotated downwardly into phantom positions C and secured therein by passing a bolt or pin through aperture 46. In this first position the corresponding blocking abuts the lock surface means 38 over the entire pivotal arc lower link 18 sweeps out around shaft 14. That is, because of the arcuated shape of locking surface 38, lower link 18 can be pivoted around shaft means 14 through its entire range and lock surface 38 will at all time engage cam follower 58 in a closely abutting relationship. If some amount of sway is desired cam means 28 is pivoted to a second position, position B as shown in FIG. 1, wherein blocking means 30, engages sway surface 38 with the hitch in a lowered or working position, and as the hitch is raised to transport position the cam follower 58 will successively engage the ramp section 40 and, as the hitch reaches its raised or transport position, the locking surface 38 is engaged. Finally, in the third position or maximum sway position the cam means 28 is rotated and secured in phantom position A. In this position the cam follower is free from any contact with the cam means in the normal working positions of the hitch. However, upon raising from a lowered position to transport position the blocking means 30 first engages the locking surface 38 at the elevated or transport position. As is apparent the operator, regardless of the position of the pivoting cam means, can lock out all sway simply by raising the draft link means in the necessary amount, although care must be taken in raising the hitch to transport position when then cam means is in position A.

Thus, it is apparent that there has been provided, in accordance with the invention, a draft link sway limiting means that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broard scope of the appended claims.

What is claimed is:

1. In a tractor having a hitch assembly including draft links laterally spaced and pivotally mounted at one end to the tractor for lateral and vertical movement relative thereto, the improvement comprising:
   a pair of cam means pivotally carried by said tractor adjacent said draft links;
   each of said cam means having a sway surface, a lock surface and a ramp surface, said sway and lock surfaces being arcs located in planes which are generally parallel and spaced apart;
   blocking means secured to each of said draft links and having a cam follower capable of abutting engagement with one of said surfaces;
   said cam means being capable of being selectively pivoted to and retained in a first locking position wherein said cam followers engage said locking surfaces over the entire range of vertical movement for said draft links, a second limited sway position wherein said cam followers engage said sway surfaces when said draft links are lowered and sequentially engage said ramp surfaces and said locking surfaces as said draft links are raised and a third free-sway position wherein said cam followers are free from any contact with said cam means when the draft links are in a lower position.

2. The hitch assembly of claim 1 wherein said draft links are connected to a torsion bar assembly whereby said draft links move in a vertical plane, said plane being parallel with and spaced apart from said major planes of said sway and lock surfaces.

3. The hitch assembly of claim 1 wherein said arcs of said sway and lock surfaces converge, pivoting of said pivoting cam means taking place therearound.

4. In a tractor having a hitch assembly including draft links laterally spaced and pivotally mounted at one end to the tractor for lateral and vertical movement relative thereto; the improvement comprising:
pivoting cam means carried by said tractor adjacent said draft links including a series of spaced apart parallel surfaces, a ramp connecting and said surfaces whereby they converge at a common point.

5. In a tractor having a hitch assembly capable of being vertically raised from a multitude of working positions to a transport position, said hitch assembly including laterally spaced lower draft links pivotally mounted on the tractor for lateral and vertical movement; an improved sway control means comprising:
cam means pivotally secured to said tractor means adjacent said draft links, said cam means having a sway surface, a ramp surface and a lock surface;
positioning means for retaining said cam means in one of first, second and third positions;
cam follower means carried on said draft links and being oriented relative to said cam means such that when said cam means is in said first position said lock surface will be in engagement with said cam follower in all vertical positions of said hitch assembly, and when said cam means is in said second position said cam follower will be in engagement with the sway surface with the hitch assembly in said working positions and as the hitch assembly is raised therefrom to transport position said cam follower means will traverse the ramp surface and engage the lock surface; and when said cam means is in said third position, said cam follower will be free from engagement with said cam means.

* * * * *